United States Patent [19]

Ziegelmeyer

[11] 4,118,872
[45] Oct. 10, 1978

[54] PUSHER LUG ALIGNING DEVICES

[76] Inventor: Harold R. Ziegelmeyer, 5010 Griffin Creek Rd., Medford, Oreg. 97501

[21] Appl. No.: 824,243

[22] Filed: Aug. 12, 1977

[51] Int. Cl.² .............................................. G01B 5/24
[52] U.S. Cl. .............................. 33/181 R; 33/185 R; 33/174 Q
[58] Field of Search ............ 33/174 E, 174 Q, 174 M, 33/180 R, 181 R, 185 R

[56] References Cited

U.S. PATENT DOCUMENTS

| | | | |
|---|---|---|---|
| 1,316,494 | 9/1919 | Meredith | 33/185 R |
| 1,643,570 | 9/1927 | Bartholdy | 33/174 E |
| 2,345,298 | 3/1944 | Semar | 33/180 R |
| 2,833,050 | 5/1958 | Byrd et al. | 33/180 R |
| 3,688,412 | 9/1972 | Keener | 33/174 M |

FOREIGN PATENT DOCUMENTS

| | | | |
|---|---|---|---|
| 875,730 | 5/1953 | Fed. Rep. of Germany | 33/181 R |
| 329,419 | 4/1958 | Switzerland | 33/181 R |

*Primary Examiner*—Richard R. Stearns
*Attorney, Agent, or Firm*—Clarence M. Crews

[57] ABSTRACT

In finger jointing machines work pieces of random lengths are pushed through the machine past end slotting saws, the strips being desirably disposed precisely at right angles to the direction in which they are advanced. It is not unusual for the work pushing members to get out of adjustment. In accordance with the present invention a testing device is provided for testing the transverse alignment of pusher members and guiding the machine operator in making corrective adjustments.

4 Claims, 12 Drawing Figures

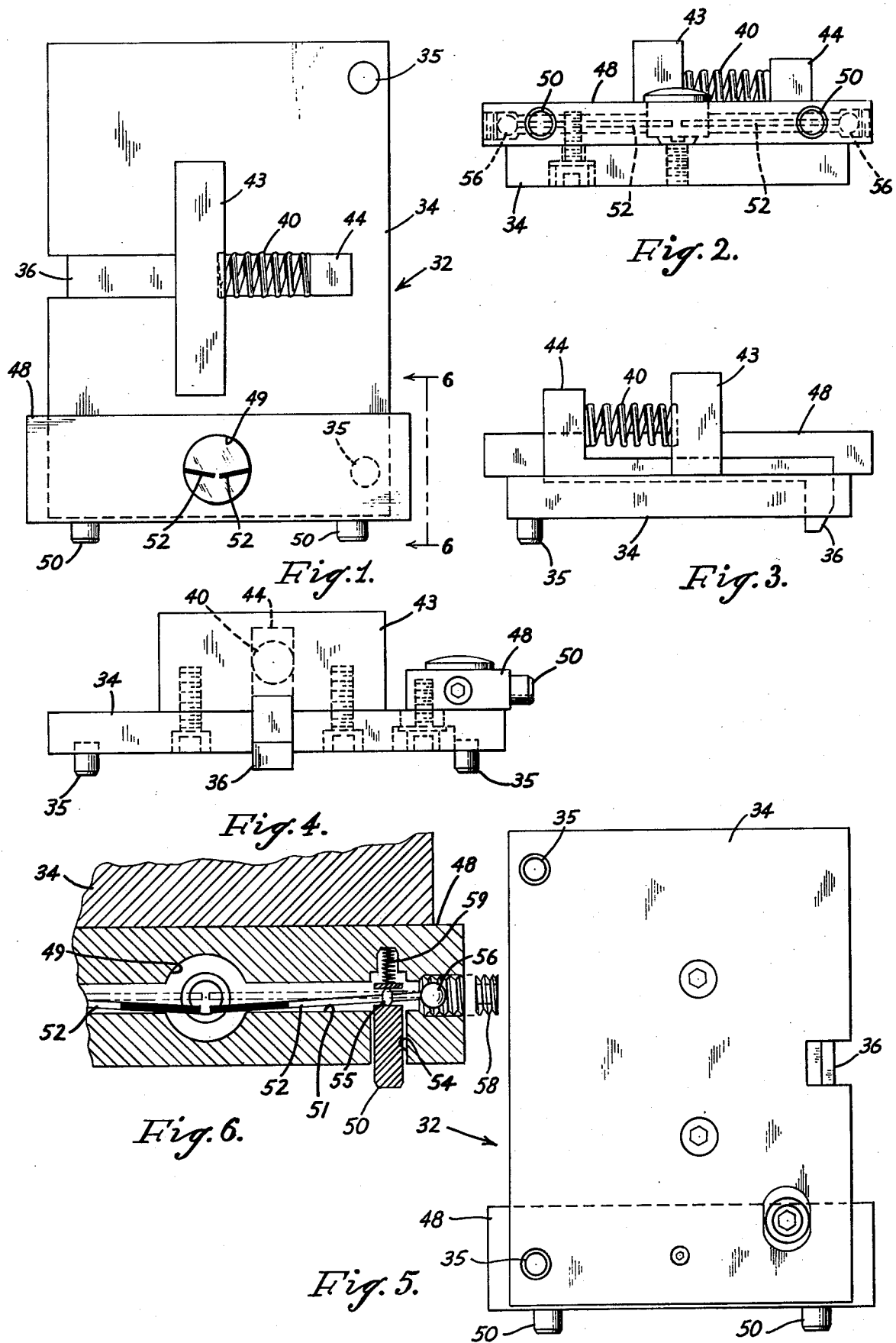

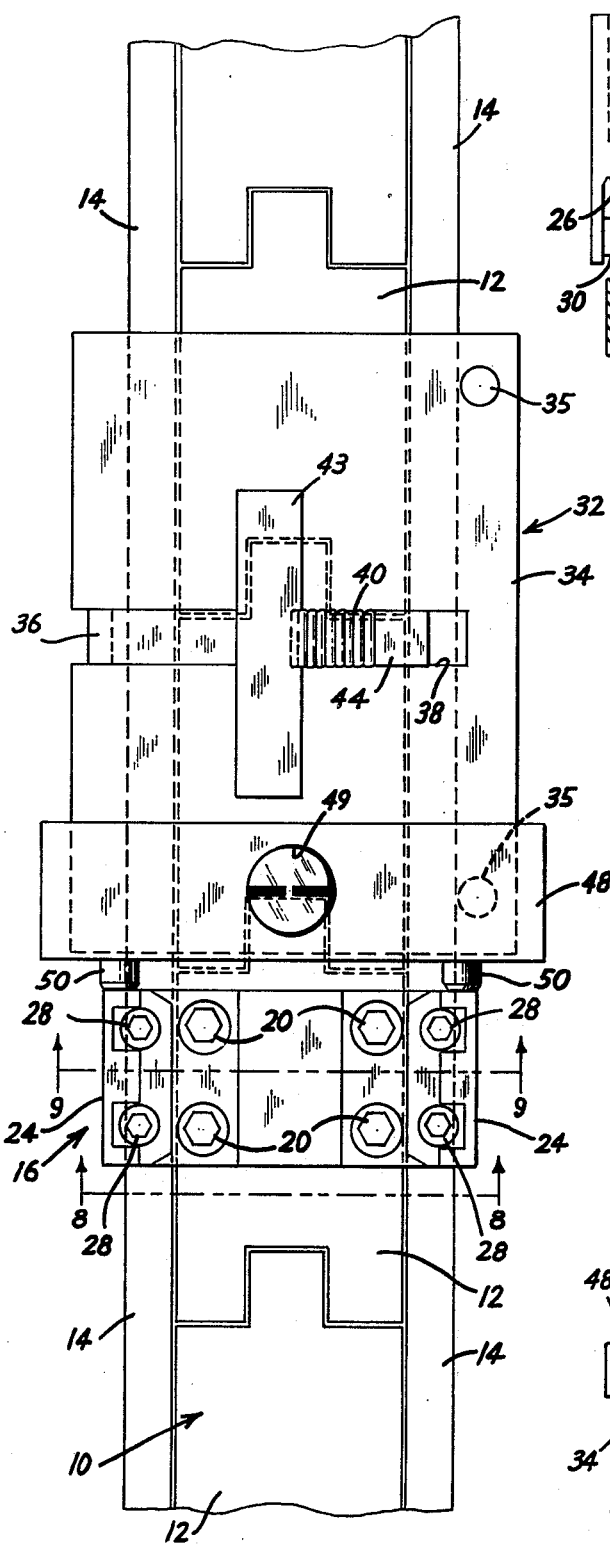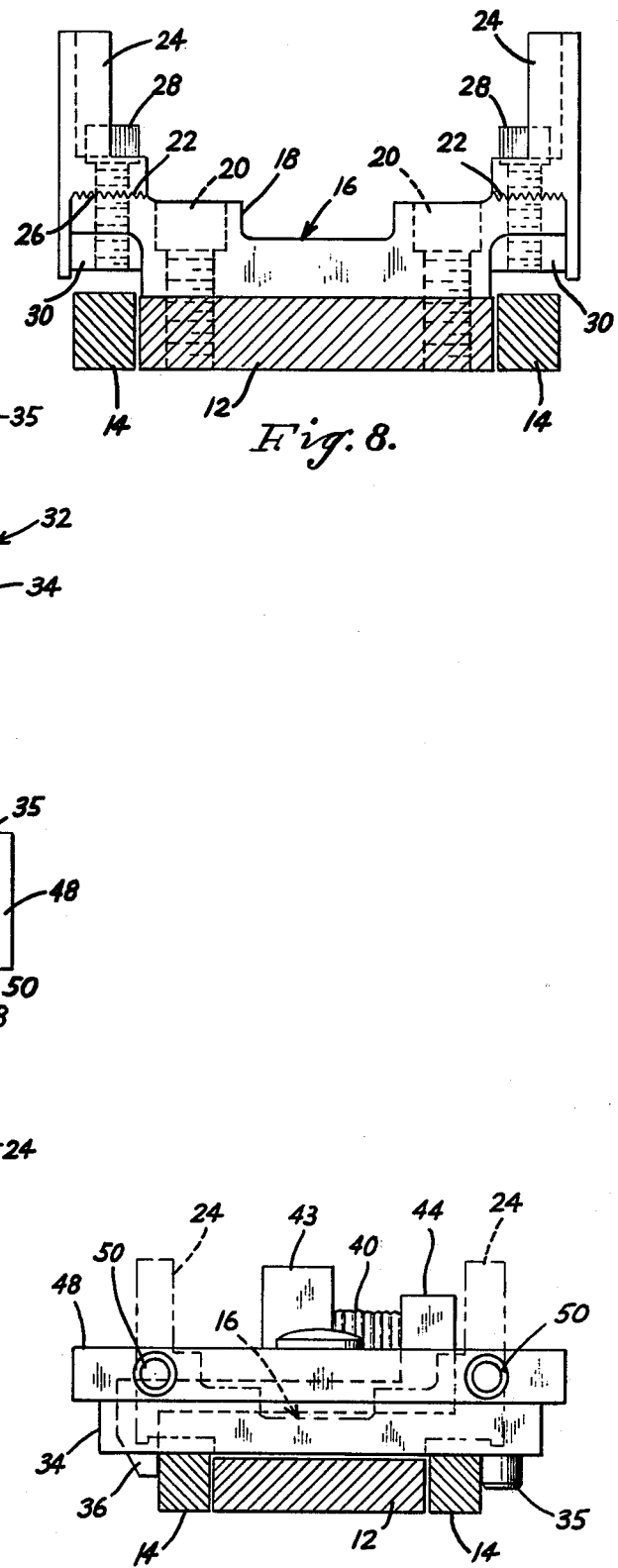
Fig. 7.  Fig. 8.  Fig. 9.

PUSHER LUG ALIGNING DEVICES

It is a widespread practice today to provide long blemish-free lengths of timber, say two-by-fours, by a procedure known as finger jointing. Knotty and/or split pieces are fractionated to eliminate the knots and splits, the retained faultfree pieces, of random lengths, being then put sidewise through an end slotting machine that prepares them for finger jointing.

In this preparatory machine the work pieces having squared ends may be first shifted to the left to align their left ends so that tapered slots of uniform predetermined depth may be formed, divided by tongues of the same uniform shape, complementary to the dimensions and shape of the slots. The work pieces are then shifted toward the right, similarly to align the right ends for a like purpose. Adhesive is then applied in the slots at one end of each work piece, so that a succession of work pieces may be snugly fitted together lengthwise and adhesively united to form composite work pieces of any desired length, which are absolutely straight, externally uniform, and completely free of blemishes and weaknesses.

It is important that the slots formed in a work piece be of uniform depth and of uniformly tapering thickness so that, with a limited amount of applied adhesive, they may be securely joined end to end in condition to be cut into any prescribed lengths. If the joints are properly formed by slots of uniform taper and uniform depth, which uniformly receive fitting tongues of exactly complementary form, composite work pieces can be produced of any desired length which are straight and completely free of blemishes.

That each slot shall be of uniform depth is a matter of prime importance because the resulting composite work piece must be straight, and the interfitting of adjacent work pieces must be uniform and complete, if the joints are to have the desired uniformity of strength and appearance.

It is essential, therefore, that each work piece be advanced past the slotting saw blades in an attitude precisely at right angles to its direction of travel.

In a plant working three shifts per day, it is usual practice to interrupt normal operations at least once during each shift to make sure that pusher means are correctly adjusted to engage each work piece precisely at right angles to the direction of conveyor advance.

It is the primary object of the present invention to provide an indicator device which may be temporarily affixed to a fixed member or members associated with the work piece advancing conveyor again and again, for indicating in each instance whether or not the work piece pusher lugs are properly aligned, and for indicating when work piece pusher lugs, initially found to be out of alignment, have been readjusted to bring them into alignment.

To this end the device is made to include self-clamping spring actuated testing means adapted to be quickly and conveniently clamped to a fixed, longitudinally extending member of the machine whose side edges extend precisely in the direction of conveyor travel. The testing means desirably includes two spring-urged, work piece engaging plungers which project forward beyond the leading end of its body, and pointers controlled by the respective plungers, which pointers have their tips closely associated with one another and aligned only when the associated work pushing means is squarely related to the direction of conveyor travel.

Other objects and advantages will hereinafter appear.

In the drawing forming part of this specification,

FIG. 1 is a plan view of an illustrative novel testing device;

FIG. 2 is a view in front elevation of the testing and adjusting device of FIG. 1;

FIG. 3 is a view in rear elevation of the testing and adjusting device of FIGS. 1 and 2;

FIG. 4 is a view in side elevation of the same testing device as viewed from the left of FIG. 1;

FIG. 5 is a bottom plan view of the same testing device;

FIG. 6 is a fragmentary, horizontal, sectional view taken on the line 6—6 of FIG. 1, looking in the direction of the arrows;

FIG. 7 is a fragmentary plan view of a conveyor and associated guide means with the testing device located in a testing position;

FIG. 8 is a vertical, sectional view taken on the line 8—8 of FIG. 7, looking in the direction of the arrows;

FIG. 9 is a view in sectional elevation taken on the line 9—9 of FIG. 7;

Figure 10:
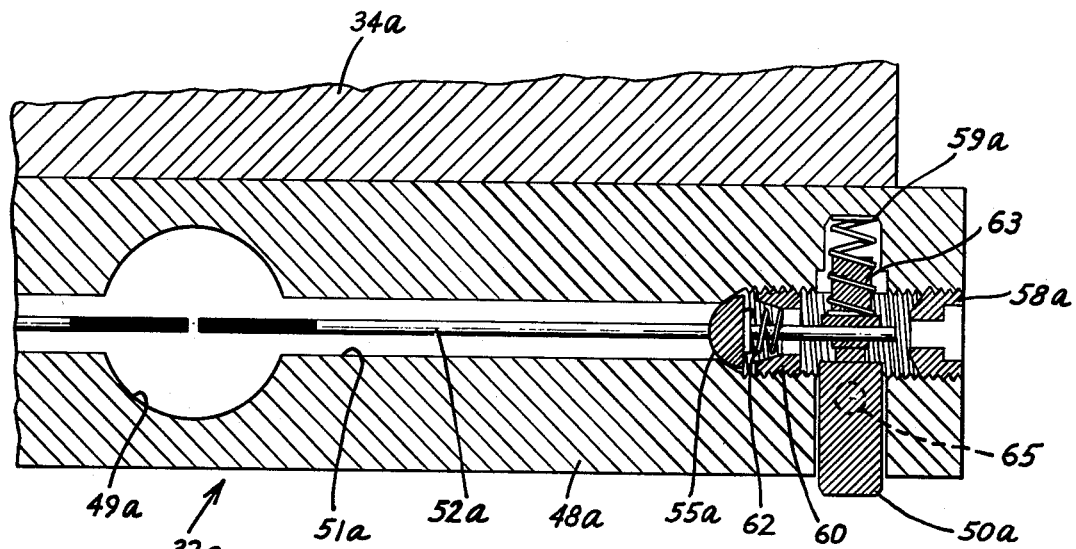
FIG. 10 is a fragmentary view in sectional elevation of a modified form of testing device.
Figure 11:
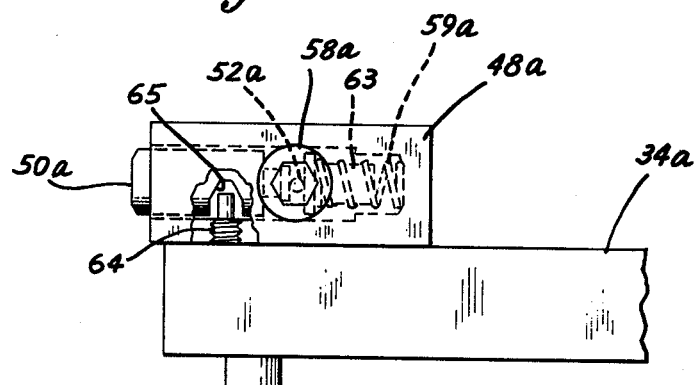
FIG. 11 is a perspective view of a testing device adapted for use in a machine having two parallel pushing conveyors for handling comparatively long work pieces.

Reference will first be had to FIGS. 7 and 8.

As seen in FIG. 7, a chain 10 composed of links 12 travels, in its active stretch, between fixed, straight, parallel, uninterrupted guide members 14,14.

Selected links 12, at uniform intervals, have affixed to them pusher carriers 16. Each carrier 16 includes a body member 18 which is fixedly secured to a link 12 of the chain 10 by headed bolts 20. Upper marginal surfaces of each body member 18 are formed marginally with teeth 22 which extend uniformly in the direction of travel of the conveyor.

Upstanding, work pushing members 24 are formed with fitting, complementary teeth 26 which also extend in the direction of conveyor travel.

The members 16 are formed with slots that extend in the direction of conveyor travel, and headed bolts 28 have their shanks passed through the slots and threaded into clamping bars 30. By virtue of this arrangement the pusher members 24 may be adjusted fore-and-aft in relation to the members 16 by which they are carried. The purpose of these adjustments is to make sure that the leading ends of associated pusher members 24 stand in a common plane precisely at right angles to the direction of active travel of the conveyor.

The pusher members 24 are of equal length so that their leading ends are disposed in a common plane when their trailing ends are disposed in a common plane.

The object of the present invention is to provide a testing device 32 which may be quickly and conveniently applied to, and removed from, the rails 14,14 and which has means for indicating either that the leading ends of the pusher members 24,24 are in transverse alignment, or that one of them leads the other.

The testing device 32 comprises a plate 34 shown as generally rectangular in form. The over-all shape of the plate 34 is not of particular significance, but the fact that it is rectangular in form is convenient for the purpose of description of other parts.

The plate 34 has two fixed posts 35,35 that project downward so that when the plate is placed on the guide members 14,14 with the posts in engagement with the right hand member 14, as shown in FIG. 7, a definite orientation of the plate 34 is established and maintained. The plate 34, having been so placed, is firmly but removably retained in that orientation.

To that end, a retaining slide 36 has its lower margin fitted into a shallow transverse groove 38 formed in the upper surface of the plate 34. A compression coil spring 40, disposed between an upstanding fixed abutment member 43 on the plate 34, and an upstanding abutment member 44 on the slide 36 urges a retaining projection of the slide 36 toward the posts 35 for clamping the plate 34 firmly in a definitely oriented position, the leading and trailing edges of the plate 34 being disposed precisely at right angles to the direction of travel of the conveyor 10.

The plate 34 has fixedly attached to its upper surface a block 48 which has a circular hole 49 disposed midway of its length, and has its forward face disposed at right angles to the direction of travel of the conveyor. The block carries feeler fingers 50 and indicator means responsive thereto for revealing the fact if a pusher 16 is out of alignment and for guiding the correction of such a defect.

The means for indicating and correcting misalignment is partially shown in FIG. 6, it being understood that the pointer controlling and setting means illustrated at the right hand end of FIG. 6 is duplicated at the left hand end.

The test is made by reference to a work piece which has been thrust into testing position by pusher members 24,24 and is designed to determine whether one of the pusher members 24 requires fore-and-aft adjustment to bring its leading end squarely into transverse alignment with the leading end of its companion pusher member 24.

As best seen in FIG. 6 the testing device includes in fixed position upon its forward end the block 48 in which the central sight opening 49 is formed. The structure illustrated at the right in FIG. 6 is duplicated at the left, but not fully shown.

The block 48 is formed with a transverse passage 51 that communicates with the central opening 49. A pusher finger 50 is slidably mounted in a passage 54 that crosses the passage 51. A pointer 52 is contained in the passage 51, has its tip exposed to view in the sight opening 49, extends through the feeler finger 50 being supported therein by a ball-like enlargement 55, and includes a ball portion 56 which is revolubly received in a hollowed set screw 58.

If the work piece whose position is controlled by the pusher members 24 is indicated to be perfectly square by the pointers, no corrective adjustment of the members 24 is called for, but if the pointers indicate the pusher members to be out of true, corrective adjustment of one, or possibly both, of the pusher members 16 is required to be made. When the pointers have been brought into exact coincidence the pushers are properly related.

When a test has been completed, and corrective adjustment has been completed if needed, the testing device is withdrawn, the chain is advanced to bring the next set of pusher devices to the testing station, and the next pusher set is similarly tested. When a comprehensive test is being made the testing is continued until every set of pushers has been tested and its pusher members have either been found to be in proper alignment or have been suitably readjusted to establish proper alignment.

When the testing device has been set in a testing and adjusting position it is firmly held in place by the coil spring which urges the upstanding members 43 and 44 away from each other. When the device requires to be released for resetting, the members 43 and 44 are pressed toward one another by the fingers of the attendant to compress the spring and the testing device is lifted free. It will be observed that the visible ends of the pointers 52 normally stand at their forward limits of movement, being urged forward by coil springs 59, but that they are shifted rearward individually by the feeler fingers 50,50. When a work piece is present and the pointers 52,52 do not occupy the positions illustrated in full lines in FIG. 6, corrective adjustment of the members 24,24 is required.

The modified form of testing device 32a illustrated in FIG. 10 is similar in construction and general principle to that of FIG. 6 but the device 32a of FIG. 10 is so modified that the pointers 52a point directly toward one another unless they are forced by the feeler fingers 50a out of that relationship. As before, only the tips of the pointers show in an opening 49a.

Each pointer 52a includes a half sphere 55a being held in place by a spring 62 compressed by a short threaded sleeve 60. Each feeler finger 50a is urged outward by a plunger 63 propelled by a coil spring 59a. A closure plug 58a is threaded into the outer extremity of the bore 51a. Each feeler finger 50a is contained by a set screw 64 engaging an oversize blind hole 65 which provides for the necessary travel and at the same time prevents its removal.

Figure 12:
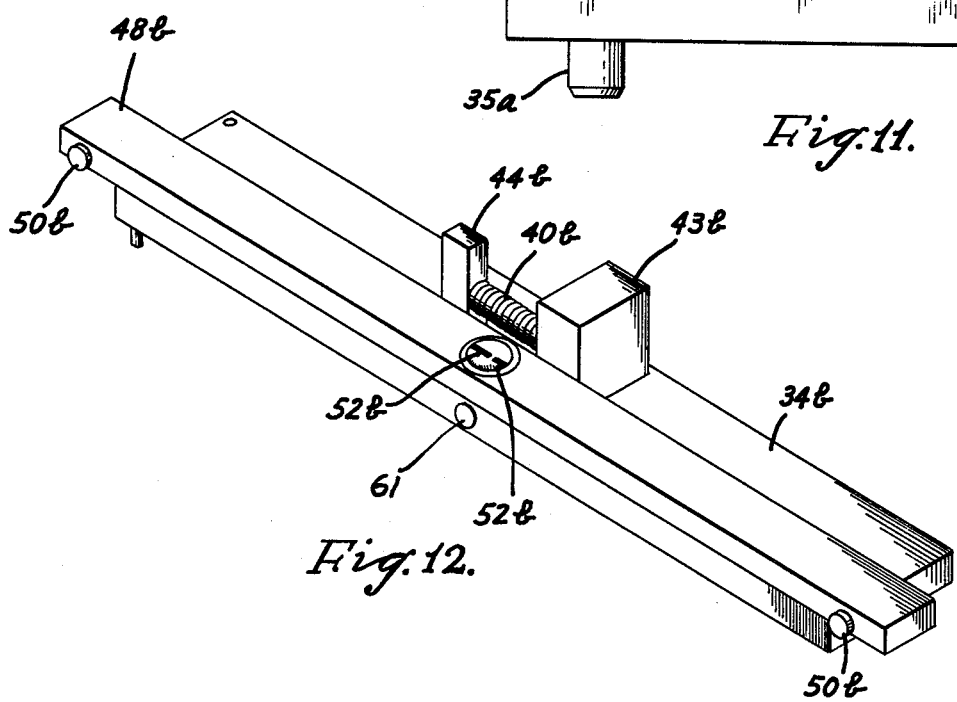
FIG. 12 is a perspective view of a testing and adjusting device designed for use with parallel widely spaced conveyors.

The testing device of FIG. 12 is the same in principle as the testing devices already described, but it is designed for use in cross-aligning pusher devices on two spaced parallel, harmoniously driven conveyors.

A long block 34b is adapted to be temporarily clamped in place in a precisely square relationship to the direction of travel of the conveyors, the construction being generally like that of the block 34 already described, save that the block is much longer and carries at its middle a feeler finger 61 for engaging a test piece of wood, or a suitable long, straight-edged metallic bar provided for the purpose of testing.

Fixedly mounted on the block 34b is a testing device 48b which may be an exact duplicate of the testing device 48 or 48a except for the greater length of the bar and of the indicator fingers.

The testing device 48b, as before, includes feeler fingers 50b through which indicator pointers 52b are individually controlled. When, through relative adjustment of pusher lugs on the respective conveyors, the pointers 52b are caused to point directly toward one another the corresponding pusher lugs on the respective conveyors may be fixed in place for operation in unison.

I have described what I believe to be the best embodiment of my invention. What I desire to cover by letters patent, however, is set forth in the appended claims.

I claim:

1. A device for use in testing and adjusting the squareness of setting of conveyor carried, work piece pusher members, of a machine designed evenly to slot the ends of work pieces preparatory to end to end finger joining of the slotted work pieces, said device comprising a plate, clamping means carried by the plate for firmly but detachably securing the plate in a fixed predetermined orientation relative to the conveyor, and an indicator device affixed to said plate, said device including forwardly projecting feeler fingers mounted and positioned to be yieldingly engageable with work pusher members of the conveyor, and indicator means responsive to the respective feeler fingers for indicating at a common read-out point the relative positions thereof with respect to a plane perpendicular to the conveyor path whereby it is indicated to the operator whether, and in what manner, the work pusher members on the conveyor must be adjusted forward or backward in order to square the pusher members relative to one another.

2. A testing device as set forth in claim 1 wherein said clamping means includes relatively slidable clamping members, spring means urging the clamping members toward a clamping relationship, and opposed, upstanding abutment means between which the spring means is compressed for maintaining the clamping members in a clamping relationship, the opposed abutment means being operable toward one another in opposition to the spring means for releasing the testing device.

3. A testing device as set forth in claim 2, which includes a pair of parallel, laterally spaced, feeler fingers, springs associated with the respective fingers for urging them individually forward, and said indicator means comprising a pair of pivotally mounted indicator pointers sized and positioned to point generally toward one another throughout their range of movement and controlled in their pivotal movements by the respective feeler fingers, the construction and arrangement being such that the pointers point directly toward one another only when the leading ends of the feeler fingers are in transverse alignment.

4. A testing device as set forth in claim 1 in which the testing device is designed for use with a machine having parallel conveyors on which the pusher members are carried, wherein the clamping means acts to secure the plate to both conveyors, and said plate includes a central fixed feeler member spaced a predetermined distance from said plane such that a work piece extending between the two conveyors may be adjusted to a squared relationship to enable the setting of the pusher members in laterally aligned positions.

* * * * *